(12) United States Patent
Duque de Souza et al.

(10) Patent No.: US 10,007,490 B1
(45) Date of Patent: Jun. 26, 2018

(54) AUTOMATIC GENERATION OF NATIVE E-COMMERCE APPLICATIONS FOR MOBILE DEVICES

(71) Applicant: Facebook, Inc., Menlo Park, CA (US)

(72) Inventors: Artur Duque de Souza, Sao Paulo (BR); Renato Chencarek, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/379,427

(22) Filed: Dec. 14, 2016

(51) Int. Cl.
*G06F 9/44* (2018.01)
*G06F 8/30* (2018.01)
*G06F 8/35* (2018.01)
*G06Q 30/06* (2012.01)

(52) U.S. Cl.
CPC ............... *G06F 8/30* (2013.01); *G06F 8/35* (2013.01); *G06Q 30/0601* (2013.01)

(58) Field of Classification Search
CPC ........................................................... G06F 8/30
USPC .................... 717/101–108, 116, 120–121
See application file for complete search history.

(56) References Cited

U.S. PATENT DOCUMENTS

| | | | | |
|---|---|---|---|---|
| 7,240,327 B2 * | 7/2007 | Singh | ................... | G06F 8/30 709/218 |
| 7,380,236 B2 * | 5/2008 | Hawley | ................... | G06F 9/451 717/109 |
| 7,676,786 B2 * | 3/2010 | Shenfield | ................... | G06F 8/10 717/104 |
| 8,261,231 B1 * | 9/2012 | Hirsch | ................... | G06F 8/20 709/201 |
| 8,341,595 B2 * | 12/2012 | Arner | ................... | G06F 8/38 717/104 |
| 8,365,164 B1 * | 1/2013 | Morgenstern | ....... | G06F 9/44552 717/108 |
| 8,548,827 B2 * | 10/2013 | Gotthardt | ............... | G06Q 50/24 705/2 |
| 8,626,602 B2 * | 1/2014 | George | ............. | G06Q 30/0641 705/26.1 |
| 8,776,011 B2 * | 7/2014 | Sharma | ................... | G06F 8/34 717/101 |
| 8,788,935 B1 * | 7/2014 | Hirsch | ................ | G06F 17/2247 715/234 |

(Continued)

OTHER PUBLICATIONS

Zhang et al, Concept Extraction for Online Shopping:, ACM, pp. 48-53, 2012.*

(Continued)

*Primary Examiner* — Anil Khatri
(74) *Attorney, Agent, or Firm* — Fenwick & West LLP (57) ABSTRACT

An online system generates customized mobile applications for e-commerce organizations. The online system obtains information about an organization from images and text displayed on a webpage of the organization. The online system additionally obtains updated lists of products or services from the organization via a data feed. An application that can run natively on a mobile device is automatically generated by incorporating the information about the organization as well as the data about product lists into one of a plurality of templates for e-commerce applications. The organization can provide users with the generated mobile application, e.g., as a way to view merchandise natively on a mobile device.

17 Claims, 5 Drawing Sheets

(56) References Cited

U.S. PATENT DOCUMENTS

| | | | | |
|---|---|---|---|---|
| 8,856,729 B2* | 10/2014 | Moore | .................. | G06F 8/38 |
| | | | | 717/105 |
| 8,924,259 B2* | 12/2014 | Neighman | ........... | G06Q 20/206 |
| | | | | 705/16 |
| 8,997,038 B2* | 3/2015 | Bozek | .................... | H04L 67/10 |
| | | | | 717/106 |
| 9,170,784 B1* | 10/2015 | Friedman | .................. | G06F 8/30 |
| 9,286,040 B2* | 3/2016 | Halley | .................... | G06F 8/41 |
| 9,299,099 B1* | 3/2016 | Jayaram | ............ | G06Q 30/0631 |
| 9,606,970 B2* | 3/2017 | Pappas | ................ | G06F 17/2247 |
| 9,858,174 B2* | 1/2018 | Straub | ................ | G06F 11/3684 |

OTHER PUBLICATIONS

Zhang et al, "Mining Consumer Impulsivity from Offline and Online Behavior", ACM, pp. 1281-1292, 2015.*

Holzmann et al, "Multivariate Testing of Native Mobile Applications", ACM, pp. 1-10, 2014.*

Xanthopoulos et al, "A Comparative Analysis of Cross-platform Development Approaches for Mobile Applications", ACM, pp. 213-220, 2013.*

Botella et al, "Selecting the best mobile framework for developing web and hybrid mobile apps", ACM, pp. 1-4, 2016.*

Jazayari et al, "End-User Programming of Web-Native Interactive Applications", ACM, pp. 11-16, 2011.*

Rosa et al, "Smart Composition of Reusable Software Components in Mobile Application Product Lines", ACM, pp. 45-49, 2011.*

Stephan et al, "Mobile Product Customization", ACM, pp. 3463-3468, 2010.*

* cited by examiner

Organization page 104

FIG. 4A

Page extraction interface 420

421 — Product Feed: /file/path/to/feed

422 — Organization Logo:

423 — Preferred Color: BLUE

Submit

AUTOMATIC GENERATION OF NATIVE E-COMMERCE APPLICATIONS FOR MOBILE DEVICES

BACKGROUND

The present invention generally relates to the field of online systems, and more specifically, to automatically generating native mobile applications.

Many companies have customers who use their mobile devices to interact with e-commerce marketplaces over the Internet. These e-commerce marketplaces provide product feeds so that search engines, price comparison websites, and affiliate networks can incorporate product information into their systems. However, these e-commerce marketplaces often struggle to build relevant mobile experiences for their users since not all sellers have the time or development teams to create their own functional e-commerce stores in the form of native mobile applications that users can use to view products on their own devices.

SUMMARY

According to various embodiments, a mobile application generation module of an online system automatically generates source code for a mobile application for e-commerce that can run natively on a mobile device. The mobile application may be automatically customized so that its users will associate it with whichever organization it represents. In one embodiment, customization is achieved using data about the organization that is obtained from a webpage representing the organization and by obtaining regularly updated details about any products the organization presents via a data feed from the organization. Customization may further include analyzing webpages of the organization in order to reflect characteristics of the organization (e.g., analyzing images on the webpage of the organization to determine a set of theme colors for the organization). According to one embodiment, the online system can also provide a set of templates so that the organization may choose how the application will ultimately appear and function for end users.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
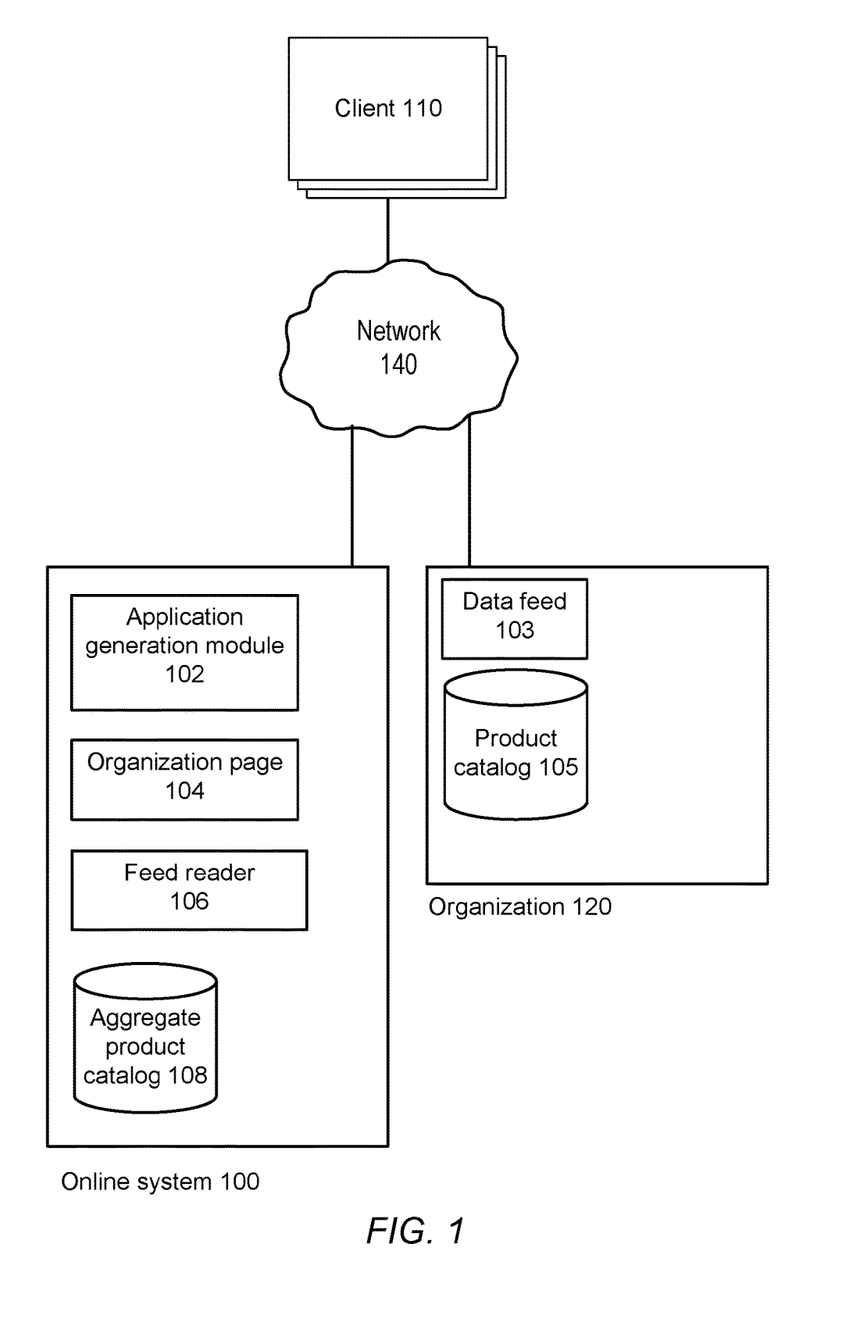
FIG. 1 illustrates a computing environment in which native mobile applications for e-commerce are automatically generated, according to one embodiment.

FIG. 1 illustrates a computing environment in which native mobile applications for e-commerce are automatically generated, according to one embodiment. FIG. 1 illustrates an online system 100 and an organization 120, such as a third party organization, connected to client devices 110 by a network 140. The online system 100 uses data from the organization 120, as well as information that references characteristics of the organization 120 stored by the online system 100, to generate mobile applications corresponding to the organization 120. The client devices 110 use the mobile applications natively to participate in e-commerce with the organization 120. These various components are now described in additional detail.

The client devices 110 are one or more computing devices capable of receiving user input as well as transmitting and/or receiving data via the network 140. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 140. In one embodiment, a client device 110 executes an application allowing a user of the client device 110 to interact with the online system 100. For example, a client device 110 executes a browser application to enable interaction between the client device 110 and the online system 100 via the network 140. In another embodiment, a client device 110 interacts with the online system 100 through an application programming interface (API) running on a native operating system of the client device 110, such as IOS® or ANDROID™.

The client devices 110 are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The organization 120 includes a product catalog 105. In one embodiment, the organization 120 further includes a data feed 103 that makes available information about items from the product catalog 105. Data feed 103 information may include one or more of availability of a product, a brand associated with the product, information about coloring or appearance of the product, information about a condition of the product, a name of the product, a manufacturer identification number of the product, and a price of the product. The data in the data feed 103 is based on information from the product catalog 105. Although the data feed 103 is shown hosted by the organization 120 in FIG. 1, in one embodiment, the data feed 103 could be hosted by the online system 100.

The product catalog 105 comprises information about the products, or services, offered to consumers by organization 120. According to one embodiment, the product catalog 105 takes the form of a structured data file with lists of items. For example, the product catalog 105 could include information about the names, colors, brands, prices, and availabilities of hats that are sold by an organization that sells hats.

The data feed 103 comprises a set of products or services made available by the organization 120 that are retrieved on a recurring basis from the product catalog 105 according to some prescribed schedule or uploaded from the product catalog 105 by the organization 120. In one embodiment, the organization may have multiple data feeds, each data feed representing various combinations of products from the product catalog 105, such as one feed for a line of hats, another feed for a line of sunglasses, etc.

The online system 100 comprises an application generation module 102, an organization page 104, a feed reader 106, and an aggregate product catalog 108. In one embodiment, the online system 100 further comprises modules associated with social networking systems, such as an object store or a graph information store, although such modules are not included in the example of FIG. 1. In one embodiment, the online system 100 further comprises an application programming interface (API) with additional accessible functionalities, although such a module is not shown in the example of FIG. 1. The application generation module 102 is described in more detail with respect to FIG. 2.

According to one embodiment, the organization page 104 is a webpage that comprises information about organization 120 and that is stored on the online system 100. For example, an organization 120 that sells handmade hats may host a webpage on the online system 100 to promote its products. The webpage may include a logo of the hat organization, a name of the organization, promotional photographs of people wearing handmade hats, information about the people who make the hats, contact information, and a page for purchasing hats. An organization page 104 may additionally include other information such as videos, user comments, and notes. In other embodiments not pictured in FIG. 1, the organization page 104 could be stored on a different server that is also connected to the network 140, but which can be accessed by the online system 100. The information stored on the organization page comprises the organization name and may further comprise one or both of an organization logo and an image file.

The feed reader 106 obtains current information about items in the product catalog 105 from the data feed 103 as an input to the application generation module 102. In one embodiment, the feed reader 106 stores information obtained from the data feed 103 in an aggregate product catalog 108 on the online system 100. In one embodiment, the feed reader 106 determines product information that has changed since the last time the feed reader 106 accessed the data feed 103, and updates information about the product catalog 105 stored within the application generation module 102. In an embodiment, the feed reader 106 obtains information about some or all items in the product catalog 105, via the data feed 103, regardless of whether the information has changed since the last time the feed reader 106 accessed the data feed 103. The feed reader 106 may periodically poll the data feed 103 to determine if there are any new items, if the attributes of any items have changed, or if any items have been removed from the product catalog 105. For example, the feed reader 106 may review the data feed 103 of a hat organization and recognize that a new type of hat is listed for sale. The feed reader 106 subsequently adds information about the new hat product to the aggregate product catalog 108.

The aggregate product catalog 108 is a data store that may contain information about product catalogs 105 from one or more organizations 120. The aggregate product catalog 108 may be updated by the feed reader 106 when it obtains new information about the product catalog 105 via the data feed 103.

Figure 2:
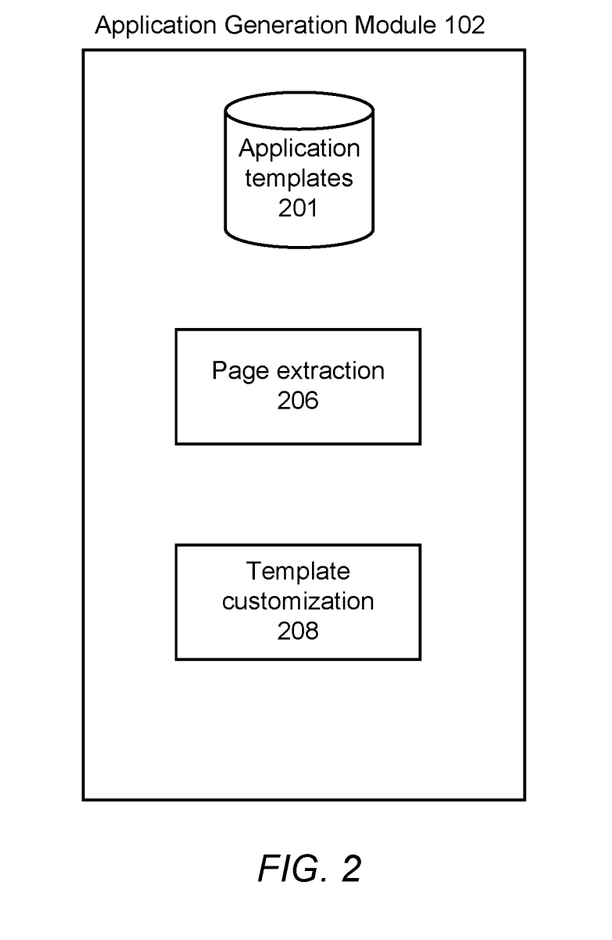
FIG. 2 is a high-level block diagram illustrating a detailed view of the application generation module 102, according to one embodiment.

FIG. 2 is a high-level block diagram illustrating a detailed view of the application generation module 102, according to one embodiment. The application generation module 102 comprises application templates 201, a page extraction module 206, and a template customization module 208.

The application templates 201 comprise a plurality of templates that describe different ways of specifying the appearance and/or functionality of mobile applications. In one embodiment, templates define options including user interfaces, animations, menu positions, and user interaction events. For example, an application template may define the layout and appearance of a list of products.

The page extraction module 206 extracts features and information about the organization 120 from a business page of the organization, herein referred to as the organization page 104, e.g., by parsing HTML constituting the page 104. In some embodiments, the page extraction module 206 performs text analysis on the contents of the organization page 104 to determine the name and the logo of the organization 120. In some embodiments, the page extraction module 206 uses an image from the organization page 104 to select a set of theme colors for the organization 120 by analyzing the image to find a plurality of frequently occurring colors within the image.

The template customization module 208 uses the data about the organization's products from the feed reader 106 and the information about the organization 120 obtained by the page extraction module 206 to build a customized mobile application by generating code native to a target platform (e.g., a mobile platform, such as the ANDROID operating system). In one embodiment, the customized mobile application is generated using one or more templates that are based on a declarative programming language (e.g., React Native).

According to one embodiment, further functionalities relating to an API residing on the online system 100 may be incorporated into the generated mobile application. For example, if the online system 100 has an API for dynamically sorting products according to the popularity of the products among customers, the generated code of the mobile application could incorporate calls to the API such that the items listed by the feed reader 106 appeared in order of current popularity within the mobile application. In some embodiments, some of the functions called by the API calls cause the online system 100 to store statistics related to the call in a statistics log. For example, the following provide examples of an API that can be accessed via HTTP requests and several uses thereof, where the URLs and parameters specify the functions to be called. As a first example, to retrieve a list of products from a category (to provide the information to the application):

```
API endpoint:
https://graph.onlinesystem.com/v2.8/<PRODUCT_CATALOG_ID>/products
Param1: fields=["category", "name", "image_url"]
Param2: filter={"name":{"i_contains":"shoes"}}
Response: {"data": [ {"category": "mens_shoes", "name":"Awesome Mens Shoes in Black", "id": "1234",
"image_url":"http://mydomain.com/shoes1.jpg" } ] }
```

As a second example, to retrieve a list of products above $12 which are still available:

```
API endpoint: https://graph.online
    system.com/v2.8/<PRODUCT_CATALOG_ID>/products
Param1: fields=["price", "sale_price", "availability", "image_url"]
Param2: filter={"price": {"gt":12}, "availability":{"eq":"in stock"}}
Response: {"data": [ {price": "13", "sale_price":"10", "id": "1234",
    "image_url":"http://mydomain.com/shoes2.jpg"}, {price": "38",
    "sale_price":"15", "id": "4567", "image_url":"http://
    mydomain.com/shoes3.jpg"
    } ] }
```

As a third example, to report statistical information about products viewed, added to cart or purchased:

```
API endpoint: https://graph.onlinesystem.com/<APP_ID>/activities
Param1: event=fb_mobile_add_to_cart (or fb_mobile_content_view,
fb_mobile_purchase)
Param2: fb_content_id=1234
Param3: fb_content_type=product
Param4: fb_currency=USD
Param5: _valueToSum =12
```

Figure 3:
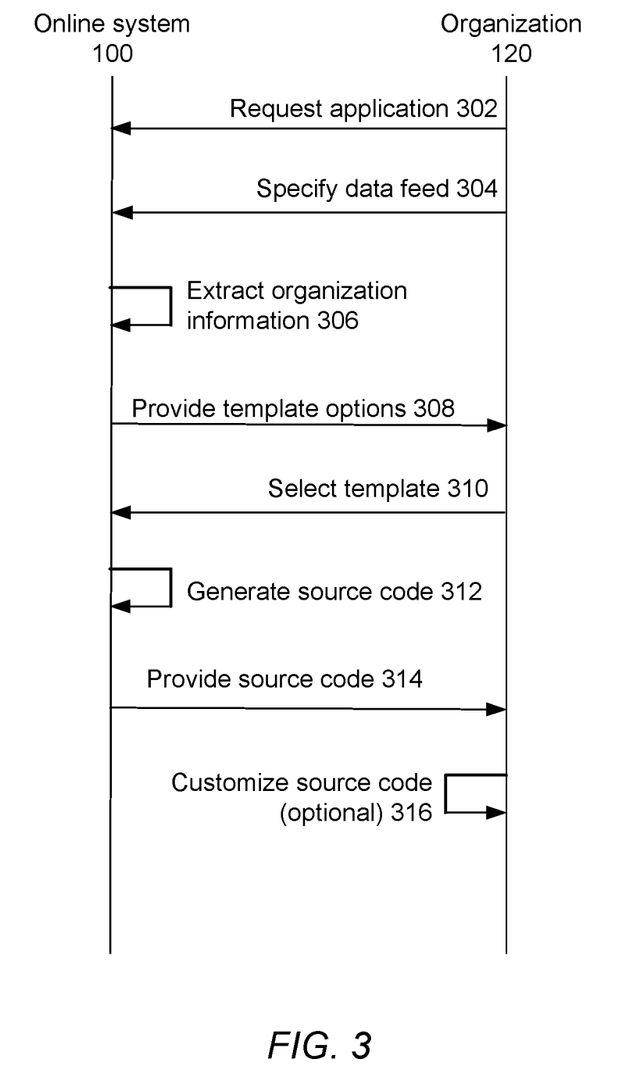
FIG. 3 illustrates the interactions that take place between different entities of FIG. 1 when automatically generating a customized mobile application, according to one embodiment.

FIG. 3 illustrates the interactions that take place between the online system 100 and the organization 120 of FIG. 1 when automatically generating a customized mobile application, according to one embodiment.

The organization 120 establishes a presence on the online system 100. In one embodiment, the process of developing a presence on the online system 100 involves creating an account on the online system 100 and creating the organization page 104.

The organization 120 makes 302 a request to the online system 100 to generate a native mobile application for the organization 120 that users will use to access information about the organization and information about products sold by the organization. In one embodiment, the request is made via a user interface provided by the online system 100 to the organization 120, such as via a link or button in an administration user interface.

The organization 120 specifies 304 a descriptor of the data feed 103 (e.g., http://www.example.com/sample_feed.tsv) to the online system 100. This allows the online system 100 to access information about items and products that are presented or sold by the organization 120. In some embodiments in which the product catalog 105 and data feed 103 are hosted by the online system 100 for the organization 120, the organization 120 specifies 304 a descriptor of the data feed 103 by indicating which of the data feeds associated with the organization 120 should be used (i.e., by an employee or other member of the organization 120 selecting one of the feeds from a drop-down menu on a configuration webpage).

The online system 100 extracts 306 information about the organization 120 from the organization page 104 using the page extraction module 206. In one embodiment, the extracted information comprises a logo, name, and theme colors associated with the organization 120.

According to one embodiment, the online system 100 provides the organization 120 with options of a plurality of the available application templates 201 and the organization 120 selects 310 a template that describes the general themes and appearance of a mobile application. In one embodiment the online system 100 applies information extracted from the organization page 104 to the application template options 201 to demonstrate how the templates would appear and function with customization. For example, the theme colors that were determined by the page extraction module 206 can be applied to the template designs to be used as background and foreground colors for widgets in the user interface. Although it is shown in FIG. 3, providing the organization 120 with template options 201 is optional and may not occur in all embodiments.

The online system 100 uses the template customization module 208 of FIG. 2 to generate 312 source code for a customized mobile application. According to one embodiment, the customization of the mobile application includes incorporating the information about the organization that was extracted by the page extraction module 206, as well as the information about the products of the organization 120 that was received via the data feed 103. The resulting customized mobile application may, for example, present products and items that are listed on the data feed 103.

The online system 100 provides 314 the organization 120 with the generated source code for the customized mobile application. The source code allows the organization to build the customized mobile application natively for a client device 110. According to one embodiment, the mobile application can access services of the online system 100 via the API of the online system 100. For example, the mobile application may access an API of the online system 100 that includes one or more functions that call dynamic advertising capabilities of the online system. The organization 120 may choose to further customize 316 or modify the source code after receiving it from the online system 100, such as to further modify the user interface or the way the organization's products are presented to users.

It is appreciated that although FIG. 3 illustrates a number of interactions according to one embodiment, the precise interactions and/or order of interactions may vary in different embodiments. For example, in one embodiment, the online system 100 could use a default template for generating the mobile application instead of providing the organization 120 with a set of template options 201.

Figure 4A:
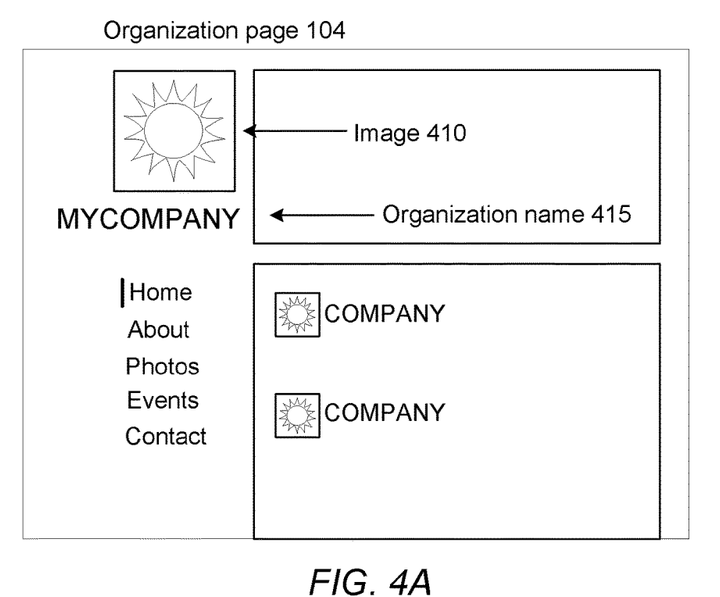
FIG. 4A illustrates a user interface corresponding to an organization page, according to one embodiment.
Figure 4B:
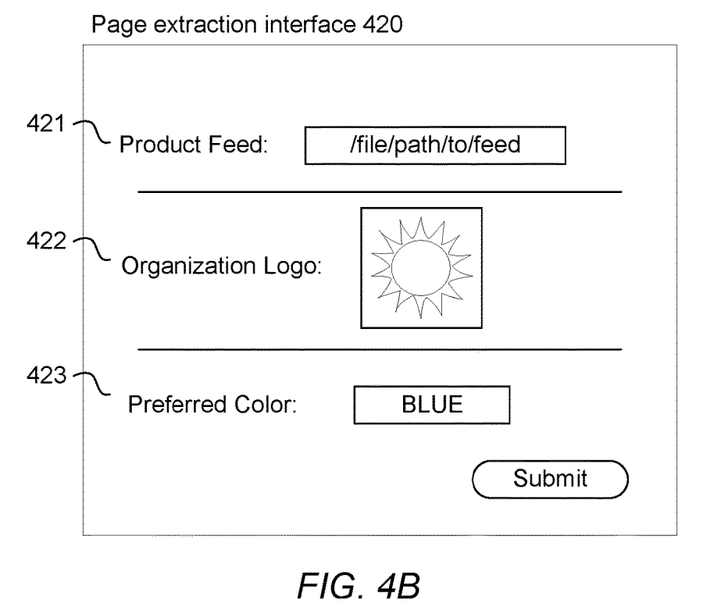
FIG. 4B illustrates an optional page extraction interface, according to one embodiment.

FIGS. 4A and 4B illustrate user interfaces corresponding to an organization page and an optional page extraction interface, both viewable through a browser, according to one embodiment. The organization page 104 of FIG. 4A comprises an image 410 and an organization name 415 ("My-Company"), according to one embodiment. The organization page 104 may further comprise information about the organization, other images, and content from the data feed 103. The page extraction interface 420 of FIG. 4B displays the relevant information extracted by the page extractor module 206 from the organization page 104. For example, the page extraction interface 420 can display the extracted information, such as the image 410 that was extracted as the logo of the organization (e.g., from the organization page 104), and one or more theme colors 423 extracted from the organization page 104. The page extraction interface 420 may additionally include information that was specified by the organization 120, such as the file path 421 to the data feed 103. In some embodiments, the page extraction interface 420 allows an organization or a representative of the organization to confirm or alter the information obtained by the page extraction module 206. The information presented on the page extraction interface 420 can be used to customize templates presented to an organization, or to customize the code generated for the mobile application (e.g., by setting the main color of the user interface of the generated mobile application to the preferred color 423). It is appreciated that the page extraction interface 420 is shown for illustrative purposes, but may not be a component of all embodiments of the system.

Figure 4C:
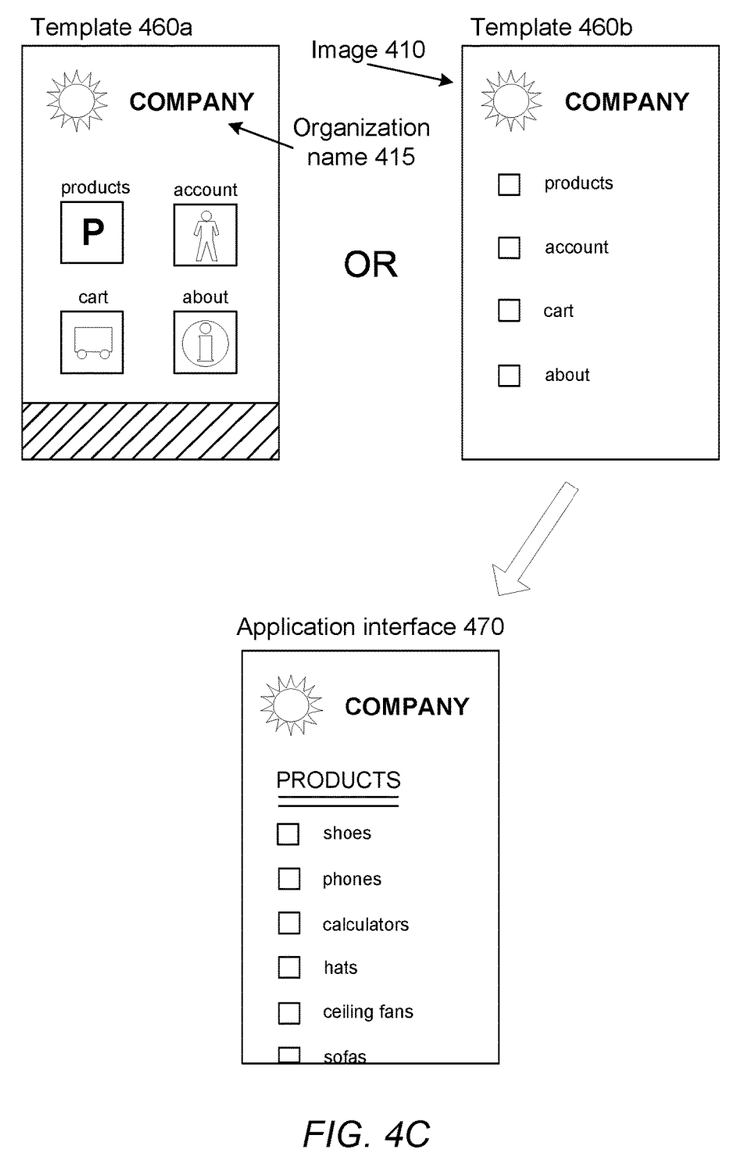
FIG. 4C illustrates user interfaces corresponding to mobile application templates and a final application interface, according to one embodiment.

FIG. 4C illustrates user interfaces corresponding to mobile application templates and a final mobile application interface, according to one embodiment. One or more mobile application templates are constructed using certain values and features that are specific to the organization 120, such as the values and features obtained from the organization page 104 by the page extraction module 206, or values and features that were optionally input into the page extraction interface 420. FIG. 4C shows two such templates, each incorporating the image 410, the organization name 415, and theme colors. According to one embodiment, the templates 460 are presented to the organization or to a representative of the organization who then selects one of the templates by which the interface of the final mobile application will be formatted. For example, in FIG. 4C, the application interface 470 shows one view of an application that was created according to the template 460b, rather than according to the template 460a.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method, the method comprising:
 receiving, at an online system, a request from a third party organization to have the online system generate a native mobile application for the organization for use by users to access information about products sold by the organization;

extracting, by the online system, information about the organization from a business page of the organization hosted by the online system, the extracting comprising parsing hypertext markup language (HTML) that makes up the business page and performing text analysis on the parsed HTML of the business page;

receiving, by the online system from the organization, a data feed comprising product information describing products sold by the organization;

generating, by the online system, source code for the native mobile application that is customized using the extracted information about the organization and the received product information, the native mobile application designed to sell products listed on the data feed, the source code including calls to an application programming interface (API) of the online system, the generating of the source code comprising:

receiving a selection from the organization of a preferred template, and generating the source code for a native mobile application using the preferred template, the product information of the data feed, and the information about the organization extracted from the business page;

providing, by the online system to the organization, the generated source code for the native mobile application for the organization to build the native mobile application; and receiving a call to the API of the online system from the native mobile application.

2. The computer-implemented method of claim 1, wherein extracting information about the organization comprises analyzing an image on the page of the organization to determine a plurality of most frequently occurring colors in the image.

3. The computer-implemented method of claim 1, wherein the data feed information comprises one or more of: availability of a product, a brand associated with the product, information about coloring or appearance of the product, information about a condition of the product, a name of the product, a manufacturer identification number of the product, and a price of the product.

4. A computer-implemented method, the method comprising:

receiving, at an online system, a request from a third party organization to generate a native mobile application for interaction with the organization;

extracting, by the online system, page information about the organization from a business page of the organization, the extracting comprising parsing hypertext markup language (HTML) that makes up the business page and performing text analysis on the parsed HTML of the business page;

receiving, by the online system from the organization, data feed information comprising information on products or services of the organization;

generating, by the online system, source code for the native mobile application that is customized using the extracted page information and feed information, the native mobile application presenting the products or services of the data feed, the source code including calls to an application programming interface (API) of the online system, the generating of the source code comprising:

receiving a selection from the organization of a preferred template, and generating the source code for a native mobile application using the preferred template, the data feed information, and the page information about the organization extracted from the business page;

providing, by the online system to the organization, the generated source code for the native mobile application.

5. The computer implemented method of claim 4, wherein extracting information about the organization comprises analyzing an image on the page of the organization to determine a plurality of most frequently occurring colors in the image.

6. The computer-implemented method of claim 4, wherein extracting information about the organization comprises determining a name of the organization using text analysis of a webpage of the organization.

7. The computer-implemented method of claim 4, wherein the source code for the native mobile application is generated using a declarative programming language.

8. The computer-implemented method of claim 4, wherein the data feed information comprises one or more of: availability of a product, a brand associated with the product, information about coloring or appearance of the product, information about a condition of the product, a name of the product, a manufacturer identification number of the product, and a price of the product.

9. The computer-implemented method of claim 4, wherein the API of the online system comprises a function that calls dynamic advertising capabilities of the online system.

10. The computer-implemented method of claim 9, wherein the online system collects statistics about calls made with the function and stores the statistics.

11. A non-transitory computer-readable storage medium storing instructions executable by a computer processor, the instructions comprising:

instructions for receiving, at an online system, a request from a third party organization to generate a native mobile application for interaction with the organization;

instructions for extracting, by the online system, page information about the organization from a business page of the organization, the extracting comprising parsing hypertext markup language (HTML) that makes up the business page and performing text analysis on the parsed HTML of the business page;

instructions for receiving, by the online system from the organization, data feed information comprising information on products or services of the organization;

instructions for generating, by the online system, source code for the native mobile application that is customized using the extracted page information and feed information, the native mobile application presenting the products or services of the data feed, the source code including calls to an application programming interface (API) of the online system, the instructions for generating of the source code comprising:

receiving a selection from the organization of a preferred template, and generating the source code for a native mobile application using the preferred template, the data feed information, and the page information about the organization extracted from the business page;

instructions for providing, by the online system to the organization, the generated source code for the native mobile application.

12. The non-transitory computer-readable storage medium of claim 11, wherein extracting information about the organization comprises analyzing an image on the page of the organization to determine a plurality of colors most frequently occurring in the image.

13. The non-transitory computer-readable storage medium of claim 11, wherein extracting information about the organization comprises determining a name of the organization name using text analysis of a web page of the organization.

14. The non-transitory computer-readable storage medium of claim 11, wherein the source code for the native mobile application is generated using a declarative programming language.

15. The non-transitory computer-readable storage medium of claim 11, wherein the data feed information comprises one or more of: availability of a product, a brand associated with the product, information about coloring or appearance of the product, information about a condition of the product, a name of the product, a manufacturer identification number of the product, and a price of the product.

16. The non-transitory computer-readable storage medium of claim 11, wherein the API of the online system comprises a function that calls dynamic advertising capabilities of the online system.

17. The computer-implemented method of claim 11, wherein the online system collects statistics about calls made with the API and stores the statistics.

\* \* \* \* \*

UNITED STATES PATENT AND TRADEMARK OFFICE
CERTIFICATE OF CORRECTION

PATENT NO. : 10,007,490 B1
APPLICATION NO. : 15/379427
DATED : June 26, 2018
INVENTOR(S) : Artur Duque de Souza and Renato Chencarek Page 1 of 1

It is certified that error appears in the above-identified patent and that said Letters Patent is hereby corrected as shown below:

In the Claims

Column 11, Line 9, Claim 13, delete "determining a name of the organization name using text analysis" and insert --determining a name of the organization using text analysis--.

Signed and Sealed this
Fifth Day of March, 2019

Andrei Iancu
*Director of the United States Patent and Trademark Office*